(12) United States Patent
Simplicio et al.

(10) Patent No.: US 11,601,263 B2
(45) Date of Patent: Mar. 7, 2023

(54) SYSTEMS AND METHODS FOR EFFICIENT KEY MANAGEMENT IN A VEHICULAR INTRANET

(71) Applicants: LG Electronics Inc., Seoul (KR); University of Sao Paulo, Sao Paulo (BR)

(72) Inventors: Marcos A. Simplicio, Sao Paulo (BR); Eduardo Lopes Cominetti, Sao Paulo (BR); Harsh Kupwade-Patil, Fremont, CA (US); Jefferson E. Ricardini, Sao Paulo (BR); Marcos Vinicius M. Silva, Sao Paulo (BR)

(73) Assignees: LG Electronics Inc., Seoul (KR); UNIVERSITY OF SAO PAULO, Sao Paulo (BR)

( * ) Notice: Subject to any disclaimer, the term of this patent is extended or adjusted under 35 U.S.C. 154(b) by 201 days.

(21) Appl. No.: 17/043,895

(22) PCT Filed: May 16, 2019

(86) PCT No.: PCT/US2019/032692
§ 371 (c)(1),
(2) Date: Sep. 30, 2020

(87) PCT Pub. No.: WO2019/222516
PCT Pub. Date: Nov. 21, 2019

(65) Prior Publication Data
US 2021/0021413 A1 Jan. 21, 2021

Related U.S. Application Data

(60) Provisional application No. 62/672,534, filed on May 16, 2018.

(51) Int. Cl.
*H04L 9/08* (2006.01)
*H04L 9/30* (2006.01)

(52) U.S. Cl.
CPC .......... *H04L 9/0836* (2013.01); *H04L 9/0869* (2013.01); *H04L 9/0891* (2013.01);
(Continued)

(58) Field of Classification Search
CPC ................................................... H04L 9/0836
See application file for complete search history.

(56) References Cited

U.S. PATENT DOCUMENTS 6,240,188 B1    5/2001  Dondeti et al.
6,993,138 B1 *  1/2006  Hardjono ............... H04L 9/0836
                                                       380/278

(Continued)

*Primary Examiner* — Bradley W Holder
(74) *Attorney, Agent, or Firm* — Duane Morris LLP; Philip Woo

(57) ABSTRACT

Embodiments described herein provide a tree-based key management protocol with enhanced computational and bandwidth efficiency. A tree structure including a plurality of nodes is formulated according to modules in a vehicle. A group key and a blinded key are computed for a leaf node from the plurality of nodes based at least in part on a multiplication operation defined in an ecliptic curve group. Or a group key and a blinded key are recursively computed for a non-leaf node based at least in part on a key derivation function and the multiplication operation involving a group key and a blinded key corresponding to nodes that is one level down to the non-leaf node.

25 Claims, 6 Drawing Sheets

(52) U.S. Cl.
CPC .......... *H04L 9/3013* (2013.01); *H04L 9/3066* (2013.01); *H04L 2209/84* (2013.01)

(56) References Cited

U.S. PATENT DOCUMENTS

| | | |
|---|---|---|
| 2005/0141706 A1 | 6/2005 | Regli et al. |
| 2005/0271210 A1 | 12/2005 | Soppera |
| 2006/0282666 A1* | 12/2006 | Kim ...................... H04L 9/0836 713/163 |
| 2007/0136612 A1 | 6/2007 | Asano et al. |
| 2009/0285386 A1 | 11/2009 | Takashima |
| 2019/0034427 A1* | 1/2019 | Trika ...................... G06F 16/21 |
| 2019/0158281 A1* | 5/2019 | Han ...................... H04L 9/0836 |

* cited by examiner

SYSTEMS AND METHODS FOR EFFICIENT KEY MANAGEMENT IN A VEHICULAR INTRANET

CROSS REFERENCE TO OTHER APPLICATIONS

This application claims the benefit of U.S. Provisional Patent Application No. 62/672,534, filed on May 16, 2018, which is hereby expressly incorporated herein by reference herein in its entirety.

FIELD OF THE INVENTION

The Invention is related to secured communications among different modules inside a vehicle. Specifically, the invention is related to an efficient protocol for managing (groups of) security keys employed for communications among onboard components within a vehicle.

BACKGROUND

In vehicular communications, a module inside a vehicle may communicate with another module inside the vehicle. Specifically, as many mechanical control units have been replaced with Electronic Control Units (ECUs) in modern vehicles, the different ECUs may exchange control messages with each other and/or other parts of the vehicle. The security of communications on board within the vehicle becomes paramount to protect the authenticity, integrity and possibly confidentiality of data exchanged among the communicating components. Otherwise, the safety of the vehicle may be compromised with malicious intent, e.g., by sending invalid reconfiguration messages for critical components, such as those related to speed or fuel regulation.

Encrypting data messages for on-board communications may improve safety and security. In addition, message integrity and authenticity in such a distributed environment inside the vehicle are also likely to be important security concerns. Sometimes, even when the messages exchanged are not confidential, acceptance of invalid data (e.g., generated either by natural causes or with malicious purposes) may lead to misguided actions and severe consequences. In some scenarios, delayed messages may also be harmful as the vehicle may not have enough time to react to emergent situations, and thus a low end-to-end latency is desired.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Example Environment

Figure 1:
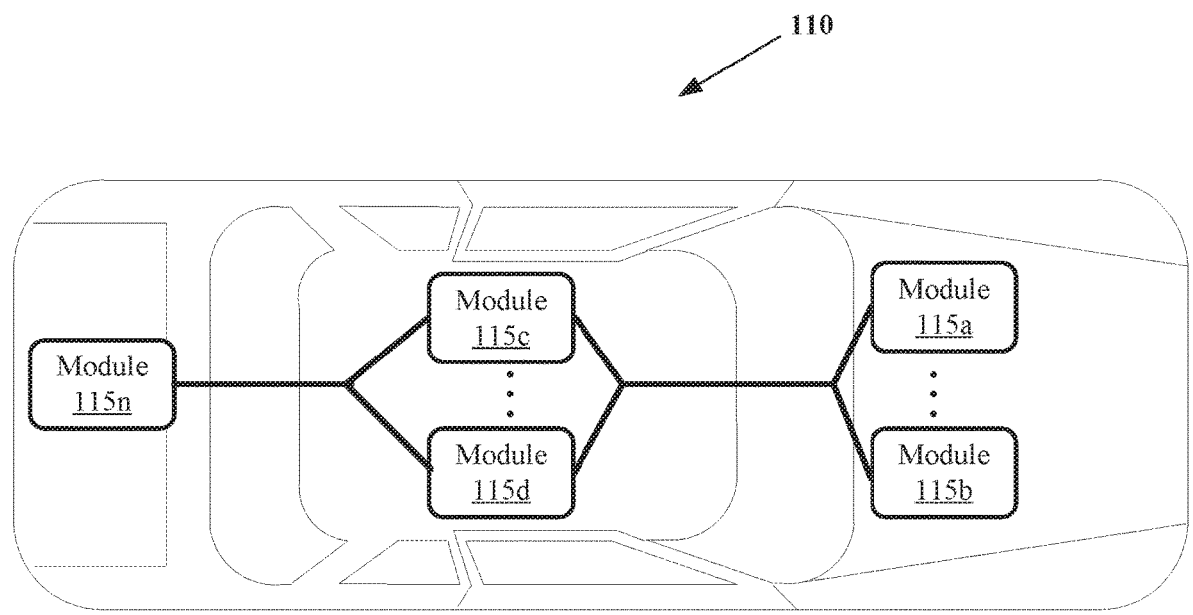
FIG. 1 illustrates an environment in which systems and methods of the present disclosure can operate, according to embodiments described herein.

FIG. 1 illustrates an environment in which systems and methods of the present disclosure can operate. FIG. 1 shows an example vehicle 110 that has multiple modules 115*a-n*. In some examples, the modules 115*a-n* may be interconnected via a data bus, a cable connection, a wireless connection, and/or the like.

In some example, the modules 115*a-n* may include an On Board Equipment (OBE) with one or more sensors—such as accelerometers, brake monitors, object detectors, LIDAR, etc.—for sensing conditions within and around vehicles 110, such as sudden breaking, wheel spin, potential collisions, etc. Using these sensors, the vehicle 110 may, for example, detect the road condition.

In some examples, modules 115*a-n* may include a computing device (e.g., device 150 shown in FIG. 2) that obtain information from other modules (e.g., sensors) so that the computing device 150 issues instructions for vehicle 110 to take action accordingly, e.g., by automatically applying brakes, adjusting steering, and/or notifying the user via a display in case the user needs to react. The brakes, steering systems and/or the display may be other example modules from modules 115*a-n* in the vehicle 110.

In some examples, modules 115*a-n* may include an on-board diagnostics module for performing diagnostics or analysis, for example, on the information provided by the sensors. In some examples, modules 115*a-n* may include a global positioning system (GPS) module to obtain its location, for example, by using GPS satellites or cellular triangulation. Modules 115a-n may further include a communication module, which, in some embodiments, can include a Direct Short Range Communications (DSRC) radio and non-DSRC radio equipment such as a mobile phone. The vehicle 110 may thus communicate through a cellular system or other road side equipment (RSE) directly, i.e., without intermediate network switches. The RSE may act like a gateway to other networks, e.g., the Internet. Using the communication module, vehicle 110 can communicate BSM messages and other information to other vehicles, entities, in the V2X or connected vehicle environment.

Different modules 115a-n on the vehicle 110 communicate by exchanging Basic Safety Messages (BSM) and/or other messages with each other and other vehicles. The BSM messages are described in detail in Whyte et al., "A security credential management system for V2V communications," *IEEE Vehicular Networking Conference*, 2013, pp. 1-8, and CAMP, "Security credential management system proof-of-concept implementation—EE requirements and specifications supporting SCMS software release 1.1," *Vehicle Safety Communications Consortium, Tech. Rep.*, May 2016 (available: https:/www.its.dot.gov/pilots/pdf/SCMS_PO-C_EE_Requirements.pdf), both of which are incorporated by reference.

In some examples, to provide such secure and safe communication among the modules 115a-n, messages exchanged among the modules 115a-n may be encrypted and/or authenticated with one or more security keys. In some examples, a robust key management scheme is deployed to handle the issuance and maintenance of cryptographic keys during the whole life cycle of the cryptographic keys, which includes distributing of keys to authorized modules and updating the keys whenever necessary. For example, when a new module enters the vehicle system, e.g., a probe inserted during periodical vehicle inspection, previous keys may be invalidated to prevent the new module from learning or forging previously exchanged messages, a property known as "backward security." For another example, when a module leaves the vehicle system, either voluntarily or not, e.g., when the inspection probe is removed from the vehicle after the inspection period, keys may be updated to prevent that module from eavesdropping the communications of remaining modules or creating valid messages for them, a property known as "forward security." In addition, the key management process is usually expected to support different communication models, including unicast, broadcast, multicast, and/or the like.

Figure 3:
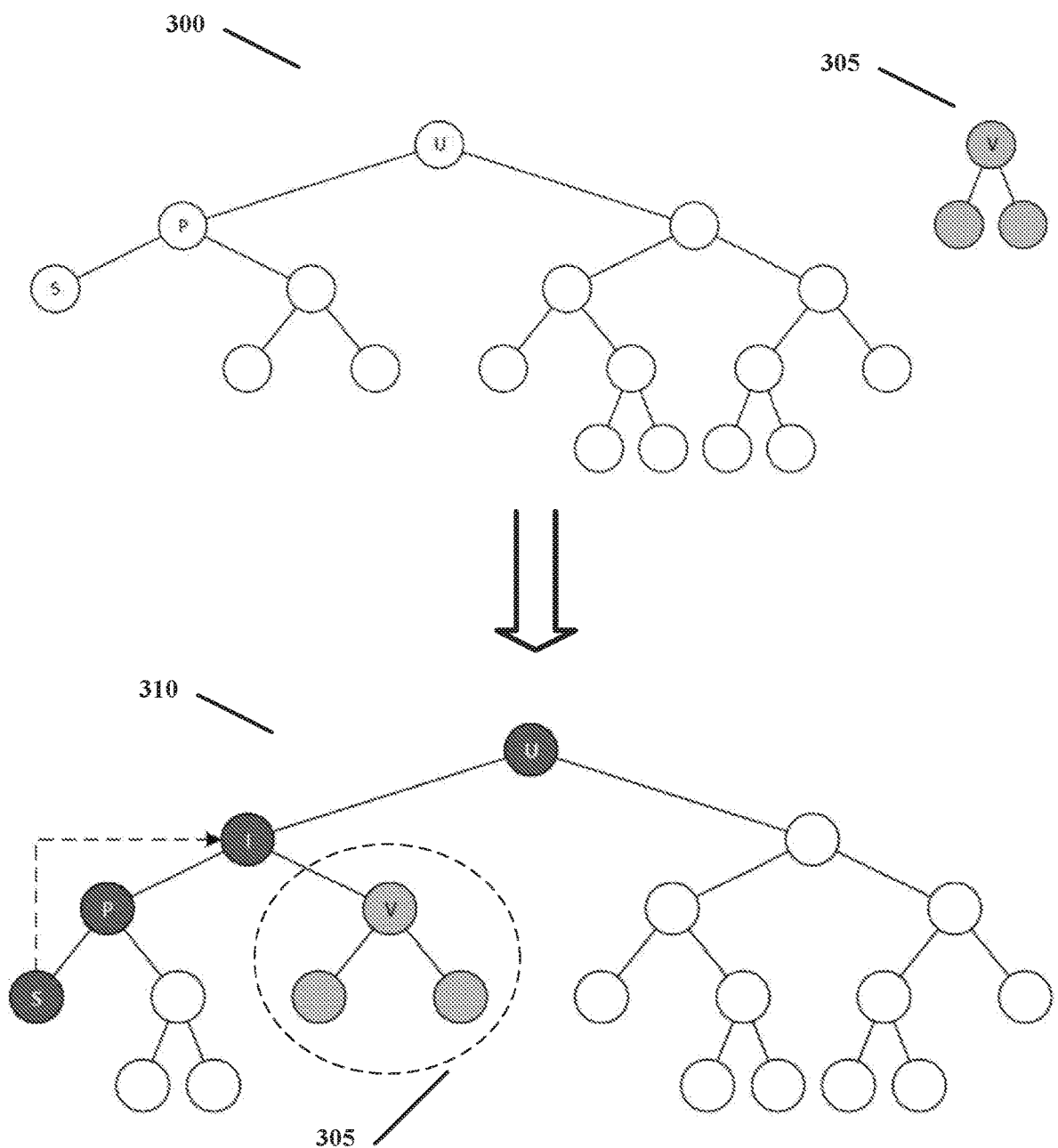
FIG. 3 is an example diagram illustrating a tree-based group key management process having an addition event on a binary tree of members (nodes), according to some embodiments.

In some examples, the modules 115a-n within the vehicle 110 may be modeled as a tree structure that is used to manage the cryptographic keys used for inter-communication between the modules. As used herein, a "tree" may be referred to as a hierarchical data structure which is recursively built by a collection of nodes, whereas a "node" may be referred to as a data unit including a specific data value of a specific data type. For example, a tree may be binary, so it starts with a root node, which is the parent node of up to two child nodes, each of which may in turn parent up to two child nodes, and so on. Each node in the tree may represent a module in the vehicle and contain information of the cryptographic keys associated with the respective module, such as a group key and a (public) blinded key. Thus, the collection of modules 115a-n (with their respective cryptographic keys) may be modeled by the tree structure, by assigning the cryptographic keys associated with a module to a node in the tree. Further examples of the tree structure representing a collection of the modules 115a-n are shown in FIGS. 3-4B.

Figure 2:
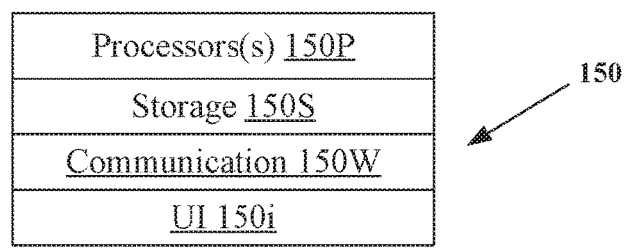
FIG. 2 illustrates an embodiment of a computing device used by the vehicle system to implement key management among modules shown in FIG. 1, according to some embodiments.

FIG. 2 illustrates an embodiment of a computing device 150 used by the vehicle system to implement key management among modules 115a-n shown in FIG. 1, according to some embodiments. The computing device 150 may be housed within the vehicle 110. In some examples, the computing device 150 may include a local device installed with the vehicle 110 and/or a remote device to remotely control the key management process.

As shown in FIG. 2, computing device 150 includes one or more computer processors 150P coupled to computer storage (memory) 150S, and wireless communication equipment 150W for radio communications. Operation of computing device 150 is controlled by processor 150P, which may be implemented as one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 150P.

Memory 150S may be used to store software executed by computing device 150 and/or one or more data structures used during operation of computing device 150. Memory 150S may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, EEPROM, FLASH-EPROM, any other memory chip or cartridge, and/or any other medium from which a processor or computer is adapted to read.

Processor 150P and/or memory 150S may be arranged in any suitable physical arrangement. In some embodiments, processor 150P and/or memory 150S may be implemented on a same board, in a same package (e.g., system-in-package), on a same chip (e.g., system-on-chip), and/or the like. In some embodiments, processor 150P and/or memory 150S may include distributed, virtualized, and/or containerized computing resources. Consistent with such embodiments, processor 150P and/or memory 150S may be located in one or more data centers and/or cloud computing facilities. In some examples, memory 150S may include non-transitory, tangible, machine readable media that includes executable code that when run by one or more processors (e.g., processor 150P) may cause the computing device 150, alone or in conjunction with other computing devices in the environment, to perform any of the methods described further herein Computing device or equipment 150 may include user interface 150i, e.g. such as present in a smartphone, an automotive information device, or of some other type device, for use by pedestrians, vehicle drivers, passengers, traffic managers, and possibly other people.

Tree-Based Key Management Approach

In view of the need to provide secure on-board communications within a vehicle system, group key management protocols may be used to manage cryptographic keys used by modules 115a-n. In some examples, a tree-based key management approach is adopted to provide forward and backward secrecy for communications among electronic control units in a vehicular Controller Area Network (CAN).

Specifically, a tree-based management protocol uses a binary tree structure to represent modules 115a-n in a vehicle 110, in which leaves represent members of authorized groups. The binary tree is designed in such a manner that each node $<l, v>$ (e.g., l denotes the level index and v denotes the position index for the v-th node at level l, for v, l starting at 0) is associated with a pair of keys, e.g., the group key $K_{<l,v>}$, known only to members in the subtree rooted at node $<l, v>$, and the blinded key $BK_{<l,v>}$, which is publicly known. These keys are computed as follows. If node $<l, v>$ is a leaf: $K_{<l,v>}=k$, where k is randomly picked (and kept secret) by the group member associated to that leaf; $BK_{<l,v>}=g^k$, where g is the generator of a prime group. Otherwise, the key is recursively computed as $K_{<l,v>}=(BK_{<l+1,2v+1>})^{K_{<l+1,2v>}}=(BK_{<l+1,2v>})^{K_{<l+1,2v+1>}}$. The keys $K_{<l,v>}$ and $BK_{<l,v>}$ can only be computed for a node $<l, v>$ when the node is in the path between the root of the binary tree and at least one leaf, called the key-path, because the computation requires the private key of the node. In this way, all nodes in the sub-tree rooted at node $<l, v>$ may employ a key derivation function to $K_{<L,V>}$ for computing a group session key. Broadcast messages are thus protected using key $K_{<0,0>}$ whereas a unicast message to node $<l, v>$ can use $BK_{<l,v>}$ as the public encryption key.

Building upon the binary tree, the tree-based key management protocol supports various types of group events, such as joining (when a new member requests to enter the group), leaving (when a participating member leaves the group), partitioning (when an entire subset of nodes requests to leave the group), merging (when an entire outside group requests to enter the group), key refresh (when the group key is to be updated), and/or the like. In some examples, these events can be combined as additions (joining or merging), subtractions (leaving or partitioning), or refreshes (key refresh), as described in FIGS. 3-4B.

FIG. 3 is an example diagram illustrating an efficient approach for handling tree-based key management addition event on a binary tree of members (nodes), according to some embodiments. Binary tree 300 shows a root node u and sub-trees. A binary tree 305 starting at root node v is to be merged with the binary tree 300 at the root node u level. The corresponding trees 300 and 305 are shown in height order, forming a list $\mathcal{L}_A$ of total members (nodes) after the merge. Starting from the highest tree, the insertion point P is selected as the shallowest rightmost node that will not increase the tree height when merged. If the tree will grow in height after the merge, then the insertion point P can be set to the root U of the tree 300. In the example of FIG. 3, the tree 300 rooted at node U is higher than the tree 305 rooted at node V, so the insertion point P is picked as the shallowest rightmost node from the root U. The choice of node $P<1,0>$ is then made because the left and right children of node P can be moved one level down without increasing the height of the entire tree 300.

The shallowest rightmost leaf node S in the subtree rooted at the insertion point P is then selected as the "sponsor" of the merger operation, meaning that the node s becomes responsible for updating the tree 300 and the keys after the merge. In the example of FIG. 1, the node S=(2,0) is chosen as the sponsor node because all other leave nodes in the insertion node p's sub-trees are at level 3.

As shown at binary tree 310, the sponsor node s creates an intermediary node I that parents the joining tree 305 and the insertion point P, and the intermediary node I in turn replaces the position of the insertion point P. To accomplish this, the sponsor node S updates its own key, computes the new blinded keys in its key-path, i.e., the nodes between node S and the root node U, shown in black, and broadcasts the new tree 310. As a result, all nodes in the new tree 310 may compute the corresponding new keys on their respective key-path. The tree 310 obtained after this merge operation is inserted at the beginning of the list $\mathcal{L}_A$, from which the trees 300 and 305 that have been merged are removed. The process may repeat until there is only one tree in $\mathcal{L}_A$. A joining event that includes a new member (node) joining the tree can be similar to merging a tree having a single node to the larger group tree following the procedure shown in FIG. 3.

Figure 4A:
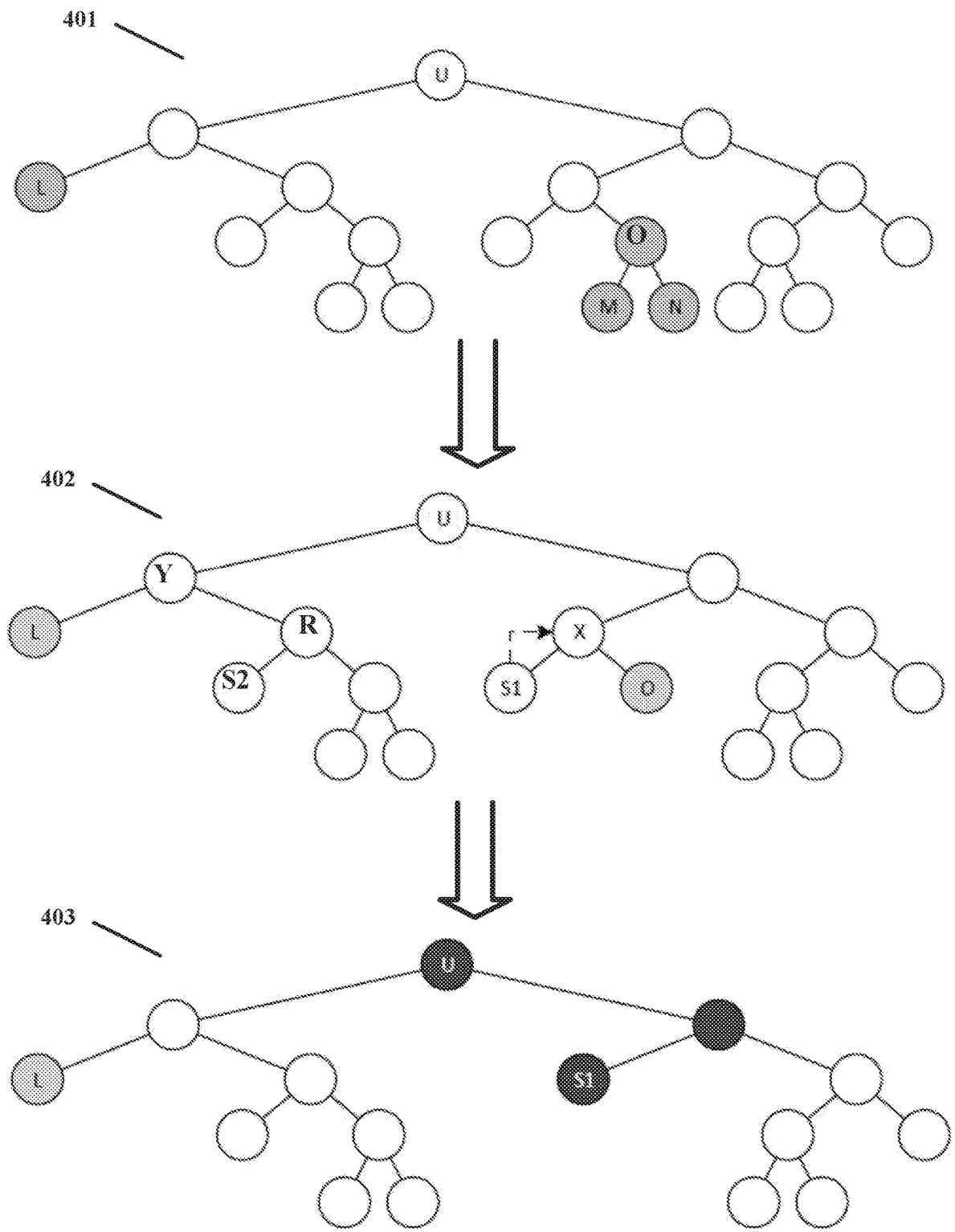
FIGS. 4A-4B show a simplified diagram illustrating a tree-based group key process having a subtraction event on a binary tree of members (nodes), according to some embodiments.
Figure 4B:
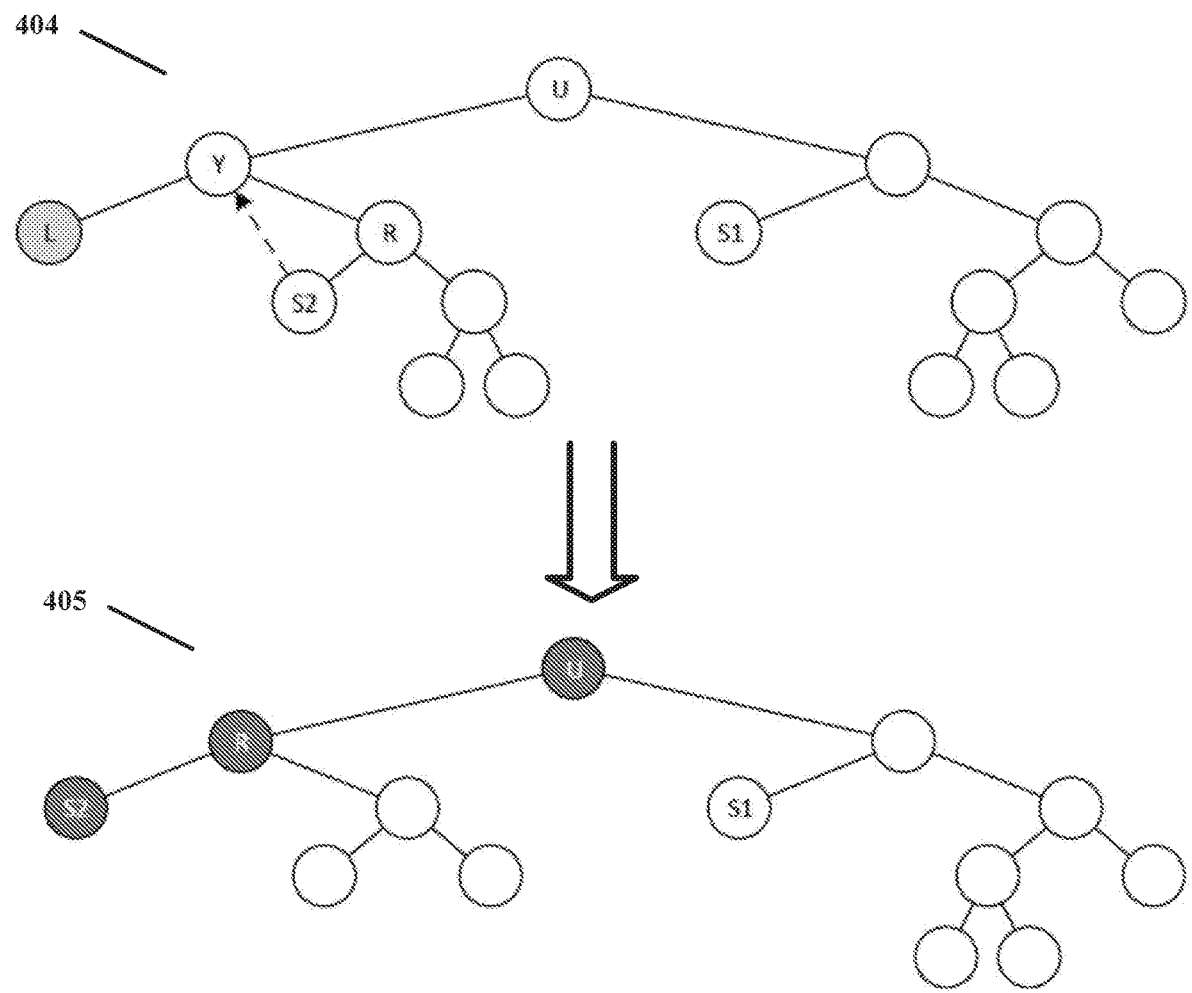

FIGS. 4A-4B show a simplified diagram illustrating a tree-based key management subtraction event on a binary tree of members (nodes), according to some embodiments. The original tree 401 shows a root node U and its subtrees. The leaving nodes L, M and N are sorted according to their depth order, forming a list $\mathcal{L}_S$. For example, if nodes L=(2,0), M=(4,10) and N=(4,11) are leaving the tree 401, then nodes M and N may be removed before node L because nodes M and N are at one level deeper from the root node U. Starting at the deepest level, each pair of sibling nodes leaving the group is collapsed into their parent node. For example, as shown in tree 402, nodes M and N are collapsed into node O after being removed from the tree. The node O is then marked as leaving, being added to the list of leaving nodes $\mathcal{L}_S$, whereas the corresponding sibling nodes M and N are removed from this list.

When $\mathcal{L}_S$ does not contain any pair of siblings, each node from the list may select its sponsor as the shallowest rightmost leaf on the subtree rooted at the leaving node's sibling node. In the example of FIGS. 4A-4B, in tree 402, node O selects node S1 as the sponsor, which is rooted at node S1 itself, and node L selects node S2 from the sibling subtree rooted at R.

Each sponsor node then executes the leaving event. First, the sponsor deletes the leaving node from the tree, collapsing the sibling subtree into the parent node. For example, the subtree rooted at node S1 is collapsed into node X (shown in tree 403), whereas the subtree rooted at node R is collapsed into node Y (shown in tress 404-405 in FIG. 4B). Subsequently, each sponsor updates its key and computes the new blinded keys in its key-path. For example, after collapsing the subtree rooted at node R collapsed into node Yin tree 404 which results in tree 405, the sponsor node S1, which is the first node to execute the leaving event, update the keys for the nodes in the key-path, i.e., the nodes shown in black in tree 403. Similarly, after collapsing the subtree rooted at node S1 collapsed into node Y at tree 404 which results in tree 405, the sponsor node S2 updates the nodes in its key-path, i.e., the nodes shown in black in tree 405. After each sponsor finishes its own processing, the sponsor broadcasts the new tree, removing the node that is already removed from the list $\mathcal{L}_S$. The partitioning ends when the list $\mathcal{L}_S$ is empty.

In some examples, when an inner group needs to update its key, the sponsor node S for this action is selected as the shallowest rightmost leaf at the group subtree. The sponsor updates its key, computes the new blinded keys in its key-path, and broadcasts the new tree.

Although the tree-based key management protocol covers multiple communication models and provide forward/backward security, a more efficient key management protocol may be employed by using elliptic curve instead of formulating the key management events as a multiplicative group event. For example, existing tree-based key management protocols are typically based on multiplicative groups and the discrete logarithm problem (DLP). An enhanced tree-based key management is described in FIG. 5 that is adapted for additive, elliptic curve groups.

Figure 5:
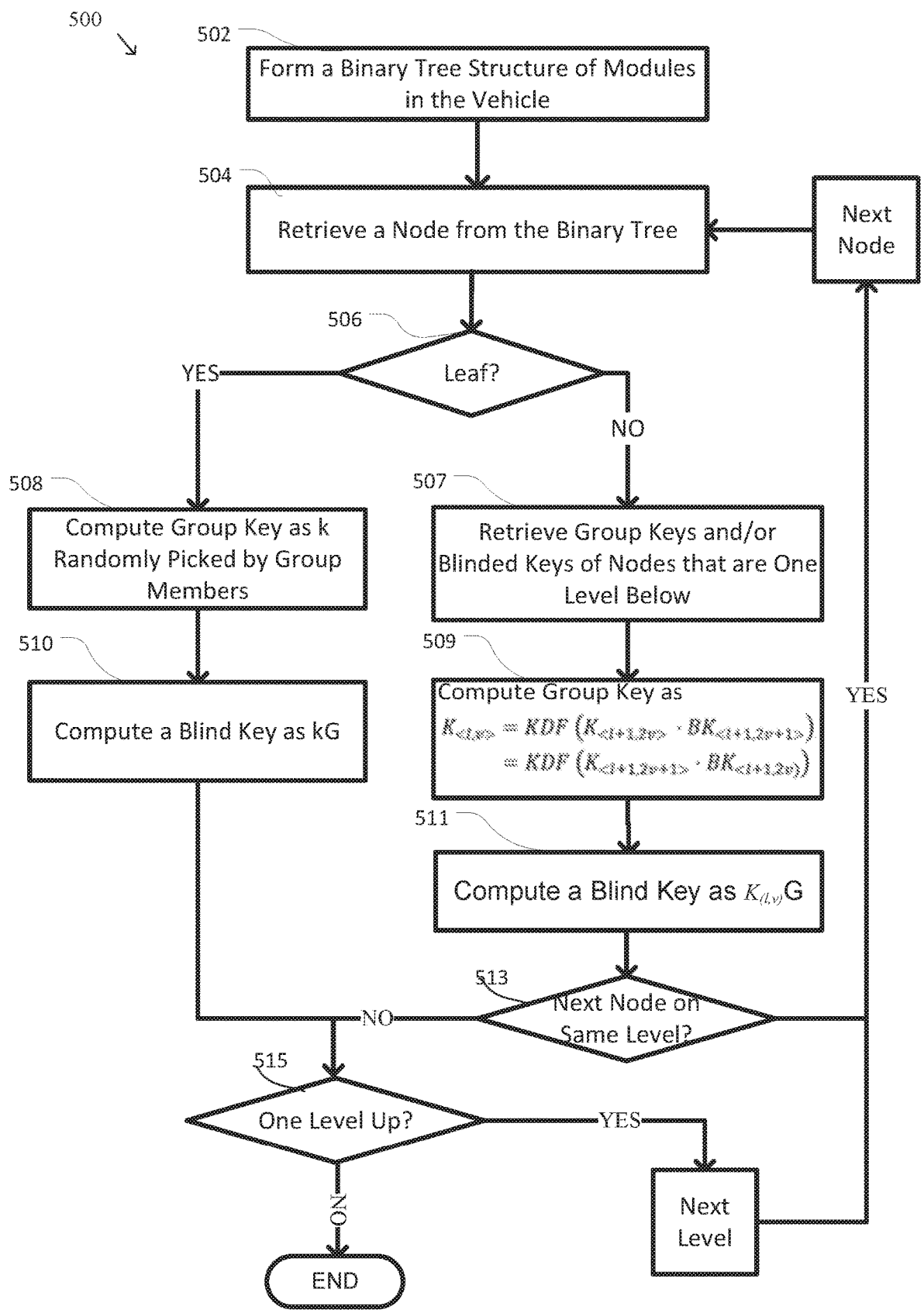
FIG. 5 provides a simplified logic flow diagram illustrating an enhanced key management operation based on an elliptic curve group, in which the corresponding key sizes and bandwidth usage are reduced, according to some embodiments.

FIG. 5 provides a simplified logic flow diagram illustrating an enhanced key management operation based on the elliptic curve DLP (ECDLP), in which the corresponding key sizes and bandwidth usage are reduced when compared to multiplicative groups, according to some embodiments. The tree-based key management protocol discussed in relation to FIGS. 3-4B is based on multiplicative groups, the security of which thus relies on the DLP, meaning that given a large prime p, a generator of the prime group g, and $BK=g^k$ for some randomly picked number k, the knowledge of BK does not reveal the secret key k.

To reduce the size of the blinded and private keys (and, hence, the bandwidth usage involved in the transmission of the blinded keys), tree-based key management schemes that are based on the DLP may be transformed into an elliptic curve counterpart. In some cryptographic protocols, the exponentiation $g^k$ is replaced by a multiplication k G in the elliptic curve group, where G is a generator point for that group (i.e., a point on the elliptic curve). In the case of tree-based key management, however, this simple transformation may not be mathematically viable because the computation of group keys on upper tree levels requires the members to use a chain of modular exponentiations on blinded keys, e.g., a common operation in tree-based key management is $BK^K$. After the transformation, this operation to an EC setting would be replaced by K·BK, but such multiplication between EC points is not defined in elliptic curve groups.

In some examples, it is proposed that the x-coordinate of the blinded keys may be used as the scalar element in scalar multiplications, so $BK^K$ may be translated to (K.x) BK. In this way, the multiplication between points is translated into a scalar multiplication by K.x, which is a valid group operation. However, the x-coordinate of EC points does not always follow a uniform distribution in the size of the group of points, because not all group elements are valid x-coordinates for an elliptic curve. Therefore, the chained scalar multiplications (K.x) G may lead to entropy loss.

Alternatively, to ensure an approximately uniform distribution of the x-coordinate of EC points and avoid entropy loss, a key derivation function may be applied to the group keys before using them. In some examples, a key derivation function (KDF), e.g., one based on a hash function or on a message authentication code. Example KDFs can be found in "NIST, Special Publication 800-56C Rev 1—Recommendation for Key-Derivation Methods in Key-Establishment Schemes" by National Institute of Standards and Technology, U.S. Department of Commerce, April 2018. The use of a KDF is also useful to avoid weak bits on the keys. Further detail on avoiding weak bits of the keys can be found in "An efficient protocol for authenticated key agreement" by Law et al., Designs, Codes and Cryptography, vol. 28, no. 2, pp. 119-134, March 2003. The aforementioned references are all hereby expressly incorporated by reference herein in their entirety.

In some examples, the group keys are computed as shown by method 500. Method 500 starts with process 502, at which a binary tree structure (e.g., tree 300 in FIG. 3) of modules (e.g., modules 115a-n in FIG. 1) in the vehicle (e.g., 100 in FIG. 1) is formulated. To compute group keys and blinded keys for each node, at process 504, a node is retrieved from the binary tree. For example, method 500 may start with a leaf node (e.g., node S in FIG. 3), and move up towards the root (e.g., root node U in FIG. 3). At process 506, when the currently retrieved node is a leaf node, method 500 proceeds to process 508, where a group key is computed as: $K_{<l,v>}=k$, where k is randomly picked number (and kept secret) by the group member associated with that leaf. At process 510, a blinded key is computed for the leaf node as: $BK_{<l,v>}=k \cdot G$.

Otherwise, if the currently retrieved node is not a leaf node at process 506, method 500 proceeds to process 507, where group keys and blinded keys of nodes that are one level below are retrieved. Specifically, the group key at node $<l,v>$ is computed as: $K_{<l,v>}=KDF (K_{<l+1,2v>} \cdot BK_{<l+1,2v+1>})$, or $=KDF (K_{<l+1,2v+1>} \cdot BK_{<l+1,2v>})$. At process 511, the blinded key for node $<l, v>$ is computed as $BK_{<l,v>}=K_{<l,v>} \cdot G$.

At process 513, when there is another node on the same level with the current processed node $<l,v>$, method 500 proceeds to the next node, and repeats at process 504. When there is no other node on the same level, method 500 proceeds to process 515 to determine whether there is one level up in the tree. When there is another level up in the tree, method 500 proceeds to the next level, and repeats at process 504. When there is no other level up, i.e., when the currently processed node $<l, v>$ is the root node, the whole tree has been updated and method 500 ends.

Figure 6:
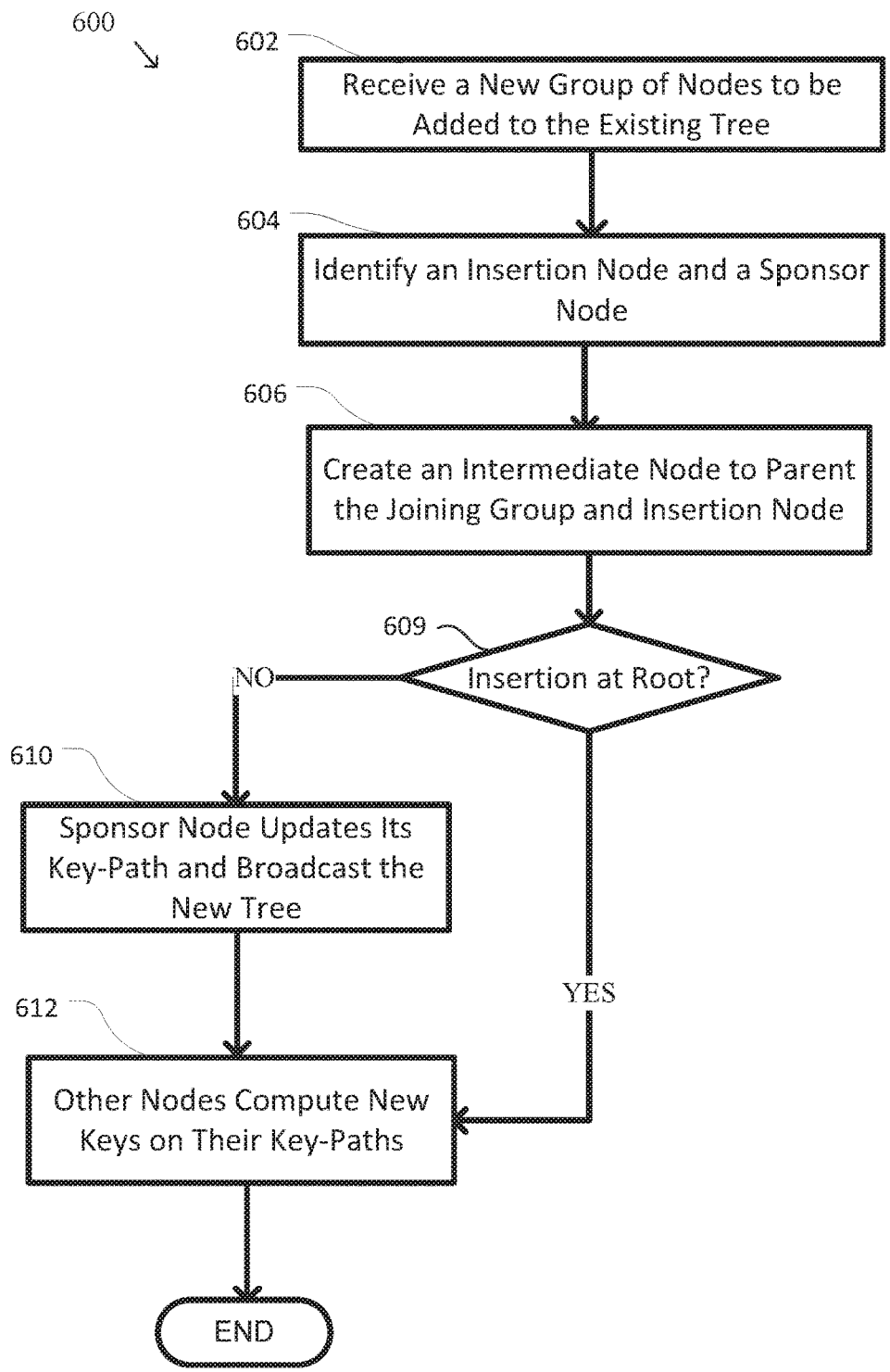
FIG. 6 provides a simplified logic flow diagram illustrating an efficient addition event when the added group is merged at the root of the tree while preserving the forward and backward security of the vehicle system shown in FIG. 2, according to some embodiments.

FIG. 6 provides a simplified logic flow diagram illustrating an efficient addition event when the added group is merged at the root of the tree while preserving the forward and backward secrecy, according to some embodiments. Method 600 is built upon the addition event illustrated in FIG. 3. Method 600 starts at process 602, where a new entity or group enters the existing tree, e.g., see tree 305 entering tree 300 in FIG. 3. At process 604, an insertion node (e.g., see node P in FIG. 3) and a sponsor node (e.g., see node S in FIG. 3) are chosen for new group insertion. For examples, the selection of the insertion node and the sponsor node is discussed in relation to node P and S in FIG. 3. At process 606, an intermediate node is created to parent the joining group and the insertion node, e.g., see node I created to parent the tree 305 and the subtree rooted at node P in FIG. 3. At process 609, method 600 determines whether the insertion node is a root node. When the insertion node is not a root node, e.g., the node P is not the root of tree 300 in FIG. 3, method 600 proceeds as discussed in relation to FIG. 3. Specifically, at process 610, the sponsor node updates the tree structure to include the entering nodes, and also updates the keys along its own (and, hence, the new node's) key-path. At process 612, all other nodes may compute new keys on their key-paths. In this way, backward secrecy is provided, because all keys received by the joining node(s) are different from those employed prior to the addition event.

At process 609, when the entering nodes are added to the root of the tree, the entering nodes, after being merged, would not learn any previously existing keys because the group key at the root is updated. For example, in FIG. 3, if the insertion node P is the root node (root node U does not exist), after tree 305 is added to the intermediate node I node V would not learn any previously existing keys of the old root node P. Thus, method 600 can proceed to process 612 directly, which skips node updates by the sponsor when the root is chosen as insertion point.

By skipping node updates when such update is unnecessary, method 600 improves the efficiency of the addition event discussed in relation to FIG. 3 without jeopardizing its security properties. Specifically, for a tree with n nodes, method 600 avoids O(lg n) node updates by the sponsor when the root is chosen as insertion point. Thus, the method 600 also saves O(n lg n) elliptic curve operations from being performed by the group of processor, as the members of the tree avoid computing the keys referring to those node updates.

In terms of security, method 600 still preserves back-ward secrecy. Any new member who learns the group key corresponding to the new root node cannot derive any previous group key, because none of the nodes holding a previous group key belong to the key-path of any new member. Forward secrecy is equally preserved, because all keys of a member that leaves the group are still updated as a result of a subtraction event that is processed in a similar way as described in relation to FIGS. 4A-4B.

In some examples, method 600 may be applied to efficiently support the addition of temporary elements to the group tree, e.g., a node that is known to leave the system after a short time. For instance, a diagnostics scanner may be periodically used to verify the health of the vehicle system, meaning the diagnostics scanner is temporarily added to the tree of vehicular modules and removed after scanning. For another instance, in the scenario of in-vehicle communications, a probe element may be connected to the system for inspection and will be removed after inspection is done. If the original tree-based key management protocol (e.g., described in relation to FIGS. 3-4B) is run in these cases, the new component would be added at any point of the tree, simply to leave after a while. As a result, the short-lived interaction with such temporary device would require two updates: one in response to the join/merge operation and another to the leave/partition, which leads to a significant amount of computation and message passing.

To reduce the waste of computational resources with components that will soon leave the vehicle system, method 600 may be utilized when handling temporary nodes. Specifically, the root of the tree may be set as the insertion point of any join event referring to the temporary elements, labeling those nodes accordingly. As a result, adding temporary nodes to the authorization tree does not lead to any update on the sponsor's key-path, as shown by method 600, but only to the creation of a new root to which those nodes are added. The update operation is still performed when the temporary nodes leave the group as discussed in relation to FIGS. 4A-4B, to ensure key independence (and, hence, forward secrecy) after any node subtraction. In this way, addition events of temporary nodes can be handled with 50% of the computational and bandwidth cost observed in the original tree-based key management protocol In some examples, temporary nodes are labeled as temporary accordingly as they are inserted in the authorization tree. In this way, a regular addition event of non-temporary nodes may ignore sub-trees with temporary nodes to avoid using the temporary nodes as insertion points for non-temporary elements.

Therefore, method 600 may be used for handling the addition of temporary modules to a vehicle (e.g., a probe inserted during periodical vehicle inspections), which can be used independently of, or in combination with the key computation based on an elliptic curve group. In some examples, method 600 may be used for additions of permanent modules as well, and may result in reduced computational and bandwidth cost when the number of components in the vehicle is $2^n$ while n=1, 2, 3, . . . .

The embodiments described above illustrate but do not limit the invention. For example, the techniques described for vehicles can be used by other mobile systems, e.g. pedestrians' smart phones or other mobile systems equipped with computer and communication systems 150. The term "vehicle" is not limited to terrestrial vehicles, but includes aircraft, boats, space ships, and maybe other types of mobile objects. The vehicle techniques can be also be used by non-mobile systems, e.g. they can be used on a computer system.

The invention is not limited to the embodiments described above. Other embodiments and variations are within the scope of the invention, as defined by the appended claims.

What is claimed is:

1. A method for tree-based key management for communications in a vehicle system, the method comprising:
retrieving, from a memory, a tree structure including a plurality of nodes, each node representing a module in the vehicle system;
computing, via a processor, a first group key and a first blinded key for a first leaf node from the plurality of nodes based at least in part on a multiplication operation defined in an ecliptic curve group; and
computing, recursively, via a processor, a second group key and a second blinded key for a non-leaf node from the plurality of nodes based at least in part on a key derivation function and the multiplication operation involving a third group key and a third blinded key corresponding to nodes that are one level down from the non-leaf node.

2. The method of claim 1, wherein forming a tree structure including a plurality of nodes comprises:
obtaining information of cryptographic keys that are used for communication between a plurality of modules in the vehicle system;
generating a binary tree of the plurality of nodes, each node being associated with a group key and a blinded key corresponding to a respective module from the plurality of modules.

3. The method of claim 1, wherein computing the first group key and the first blinded key for the first leaf node from the plurality of nodes based at least in part on the multiplication operation defined in the ecliptic curve group comprises:
determining a level index and a position index associated with the first leaf node;
generating a random number as the first group key for the first leaf node; and
computing the first blinded key by the multiplication operation over the first group key and a generator point for the ecliptic curve group.

4. The method of claim 1, wherein computing, recursively, the second group key and the second blinded key for the non-leaf node from the plurality of nodes based at least in part on the key derivation function and the multiplication operation involving the third group key and the third blinded key corresponding to nodes that are one level down from the non-leaf node comprises:
obtaining the third group key corresponding to one child node of the non-leaf node;
obtaining the third blinded key corresponding to another child node of the non-leaf node;
multiplying the third group key and the third blinded key based on the multiplication operation;
applying the key derivation function over a multiplication result from the multiplication operation; and
assigning a result from the key derivation function as the second group key for the non-leaf node.

5. The method of claim 4, further comprising:
computing the second blinded key by multiplying the second group key and a generator point for the ecliptic curve group based on the multiplication operation.

6. The method of claim 1, further comprising:
receiving a new group of nodes to be added to the tree structure;
identifying an insertion node to add the new group of nodes and a sponsor node; and
creating an intermediate node to parent the insertion node and the new group of nodes.

7. The method of claim 6, further comprising:
determining whether the insertion node is a root node of the tree structure;
when the insertion node is the root node of the tree structure:
skipping updating any group key or blinded key along a key path of the sponsor node; and
updating group keys or a blinded key on key paths of nodes other than the sponsor node.

8. The method of claim 6, further comprising:
determining that the new group of nodes to be added are temporary elements to be removed from the tree structure after a period of time; and
identifying a root node of the tree structure as the insertion node.

9. A system for tree-based key management inside a vehicle, the system comprising:
a processor;
a memory storing a tree structure including a plurality of nodes representing a plurality of modules inside the vehicle and processor-executable instructions for the tree-based key management, the processor-executable instructions being executed by the processor to:
compute a first group key and a first blinded key for a first leaf node from the plurality of nodes based at least in part on a multiplication operation defined in an ecliptic curve group; and
compute, recursively, a second group key and a second blinded key for a non-leaf node from the plurality of nodes based at least in part on a key derivation function and the multiplication operation involving a third group key and a third blinded key corresponding to nodes that are one level down from the non-leaf node.

10. The system of claim 9, wherein the processor-executable instructions are executed by the processor to:
obtain information of cryptographic keys that are used for communication between a plurality of modules in the vehicle system;
generate a binary tree of the plurality of nodes, each node being associated with a group key and a blinded key corresponding to a respective module from the plurality of modules.

11. The system of claim 9, wherein the processor-executable instructions are executed by the processor to compute the first group key and the first blinded key for the first leaf node from the plurality of nodes based at least in part on the multiplication operation defined in the ecliptic curve group by:
determining a level index and a position index associated with the first leaf node;
generating a random number as the first group key for the first leaf node; and
computing the first blinded key by the multiplication operation over the first group key and a generator point for the ecliptic curve group.

12. The system of claim 9, wherein the processor-executable instructions are executed by the processor to compute, recursively, the second group key and the second blinded key for the non-leaf node from the plurality of nodes based at least in part on the key derivation function and the multiplication operation involving the third group key and the third blinded key corresponding to nodes that are one level down from the non-leaf node by:
obtaining the third group key corresponding to one child node of the non-leaf node;
obtaining the third blinded key corresponding to another child node of the non-leaf node;
multiplying the third group key and the third blinded key based on the multiplication operation;
applying the key derivation function over a multiplication result from the multiplication operation; and
assigning a result from the key derivation function as the second group key for the non-leaf node.

13. The system of claim 12, wherein the processor-executable instructions are further executed by the processor to:
compute the second blinded key by multiplying the second group key and a generator point for the ecliptic curve group based on the multiplication operation.

14. The system of claim 9, wherein the processor-executable instructions are further executed by the processor to:
receive a new group of nodes to be added to the tree structure;
identify an insertion node to add the new group of nodes and a sponsor node; and
create an intermediate node to parent the insertion node and the new group of nodes.

15. The system of claim 14, wherein the processor-executable instructions are further executed by the processor to:
determine whether the insertion node is a root node of the tree structure;
when the insertion node is the root node of the tree structure:
skip updating any group key or blinded key along a key path of the sponsor node;
and
update group keys or a blinded key on key paths of nodes other than the sponsor node.

16. The system of claim 14, wherein the processor-executable instructions are further executed by the processor to:
determine that the new group of nodes to be added are temporary elements to be removed from the tree structure after a period of time; and
identify a root node of the tree structure as the insertion node.

17. An apparatus with tree-based key management, comprising:
a plurality of modules that are communicatively interconnected;
a memory storing a tree structure having a plurality of nodes corresponding to the plurality of modules;
a processor communicatively coupled to the plurality of modules and the memory, the processor configured to:
compute a first group key and a first blinded key for a first leaf node from the plurality of nodes based at least in part on a multiplication operation defined in an ecliptic curve group; and
compute, recursively, a second group key and a second blinded key for a non-leaf node from the plurality of nodes based at least in part on a key derivation function and the multiplication operation involving a third group key and a third blinded key corresponding to nodes that are one level down from the non-leaf node.

18. The apparatus of claim 17, wherein the processor is further configured to:
- obtain information of cryptographic keys that are used for communication between a plurality of modules in the vehicle system;
- generate a binary tree of the plurality of nodes, each node being associated with a group key and a blinded key corresponding to a respective module from the plurality of modules.

19. The apparatus of claim 17, wherein a first means corresponding to the first leaf node is configured to encrypt a data message according to the first group key or the first blinded key and transmit the encrypted data message to a destination node corresponding to another module.

20. The apparatus of claim 17, wherein the processor is configured to compute the first group key and the first blinded key for the first leaf node from the plurality of nodes based at least in part on the multiplication operation defined in the ecliptic curve group by:
- determining a level index and a position index associated with the first leaf node;
- generating a random number as the first group key for the first leaf node; and
- computing the first blinded key by the multiplication operation over the first group key and a generator point for the ecliptic curve group.

21. The apparatus of claim 17, wherein the processor is configured to compute, recursively, the second group key and the second blinded key for the non-leaf node from the plurality of nodes based at least in part on a key derivation function and the multiplication operation involving the third group key and the third blinded key corresponding to nodes that are one level down from the non-leaf node by:
- obtaining the third group key corresponding to one child node of the non-leaf node;
- obtaining the third blinded key corresponding to another child node of the non-leaf node;
- multiplying the third group key and the third blinded key based on the multiplication operation;
- applying the key derivation function over a multiplication result from the multiplication operation; and
- assigning a result from the key derivation function as the second group key for the non-leaf node.

22. The apparatus of claim 21, wherein the processor is further configured to:
- compute the second blinded key by multiplying the second group key and a generator point for the ecliptic curve group based on the multiplication operation.

23. The apparatus of claim 17, wherein the processor is further configured to:
- receive a new group of nodes to be added to the tree structure;
- identify an insertion node to add the new group of nodes and a sponsor node; and
- create an intermediate node to parent the insertion node and the new group of nodes.

24. The apparatus of claim 23, wherein the processor is further configured to:
- determine whether the insertion node is a root node of the tree structure;
- when the insertion node is the root node of the tree structure:
  - skip updating any group key or blinded key along a key path of the sponsor node; and
  - update group keys or a blinded key on key paths of nodes other than the sponsor node.

25. The apparatus of claim 24, wherein the processor is further configured to:
- determine that the new group of nodes to be added are temporary elements to be removed from the tree structure after a period of time; and
- identify a root node of the tree structure as the insertion node.

* * * * *